United States Patent [19]
Fujiwara

[11] Patent Number: 5,840,390
[45] Date of Patent: Nov. 24, 1998

[54] FRM DISC PREFORM AND MANUFACTURING METHOD THEREOF

[75] Inventor: Chikara Fujiwara, Komaki, Japan

[73] Assignee: Research Institute of Advanced Material Gas-Generator Co., Ltd. (AMG), Tokyo, Japan

[21] Appl. No.: 539,040

[22] Filed: Oct. 4, 1995

[30] Foreign Application Priority Data

Nov. 2, 1994 [JP] Japan .................................. 6-269432

[51] Int. Cl.$^6$ ........................................................ D04H 3/02
[52] U.S. Cl. ........................ 428/37; 428/67; 428/293.1; 428/457; 156/169; 156/252
[58] Field of Search ............................ 428/37, 64.1, 67, 428/293.1; 442/225, 226, 245, 457; 156/169, 252

[56] References Cited

U.S. PATENT DOCUMENTS

| | | | |
|---|---|---|---|
| 3,600,103 | 8/1971 | Gray et al. | 416/224 |
| 5,228,493 | 7/1993 | Siemers et al. | 164/46 |
| 5,431,984 | 7/1995 | Keck et al. | 428/175 |

FOREIGN PATENT DOCUMENTS

| | | |
|---|---|---|
| 2042254 | 12/1991 | Canada . |
| 2042273 | 1/1992 | Canada . |
| 2 663 954 | 1/1992 | France . |
| 2 663 955 | 1/1992 | France . |
| 2 047 209 | 4/1971 | Germany . |
| 2 245 597 | 1/1992 | United Kingdom . |
| 2 245 598 | 1/1992 | United Kingdom . |

*Primary Examiner*—Elizabeth Evans
*Attorney, Agent, or Firm*—Wenderoth, Lind & Ponack, L.L.P.

[57] ABSTRACT

An FRM disc preform for manufacturing an FRM disc used as compressor rotors of aircraft engines. The FRM disc preform (1) of the present invention includes a reinforcing fiber (2) wound in a spiral shape with flat faces and a spray coating (7) of a matrix metal formed on one of the flat faces of the spirally wound reinforcing fiber (2) to hold the spiral shape by fixing the upper layer and the lower layer of the spiral. Thereby, the spiral shape is held tightly without collapsing and handling in a laminating process and a combined forming process becomes extremely simplified, and thus the manufacturing efficiency and accuracy of the FRM disc can be enhanced.

11 Claims, 5 Drawing Sheets

FRM DISC PREFORM AND MANUFACTURING METHOD THEREOF

BACKGROUND OF THE INVENTION

1. Field of the Invention

The present invention relates to a fiber reinforced metal disc preform (herein a fiber reinforced metal is referred to as "FRM") and a manufacturing method thereof, which is suitable for manufacturing an FRM disc used for manufacture of rotating disc-like products, such as compressor rotors of gas turbines using gas fuel or liquid fuel, specifically to be used under severe conditions accompanying high speed rotations and large stresses of the centrifugal force.

2. Description of the Prior Art

In a development of next generation aircraft engines such as for high speed intermunicipal passenger aircrafts, increase of combustion temperature and weight reduction are important targets, and thus the development of new materials which are light weight and have a high heat resistance is desired. In view of this situation, an application of FRM discs to compressor rotors of gas turbines used in aircraft engines is presumed to produce the largest effect.

FIGS. 5A–E are drawings showing a manufacturing process of an FRM disc which is known in the prior art. As shown in FIGS. 5(A) and FIG. 5(B), a matrix metal ribbon 01 made of a Ti alloy, such as a Ti-6Al-4V or a Ti-15V-3Cr-3Al-3Sn, and a reinforcing fiber 02, such as of a SiC, are lapped and wound in a spiral shape to form a preform 04. The preform 04, the matrix metal ribbon 01 and a matrix metal foil 03 made of a same material as that of the matrix metal ribbon 01 are laminated one by one as shown in FIG. 5(C) and molded to a laminate 05 forming a disc of a desired diameter and thickness as shown in FIG. 5(D). Since the laminate 05 is heated and pressurized, the reinforcing fiber 02 and the matrix metal, consisting of the matrix ribbon 01 and the foil 03, are combined, thus an FRM disc 06 is manufactured as shown in FIG. 5(E).

In the manufacturing process, as shown in FIGS. 5(A) and FIG. 5(B), forming of a spiral shape of the preform 04 using the matrix ribbon 01 and the reinforcing fiber 02, and handling thereof, are made simply by its winding tension given at the time of forming. The spiral shape of the preform 04 of the matrix metal ribbon 01 and the reinforcing fiber 02 collapse easily at the time of piling up to make a laminate as shown in FIG. 5(C), etc. However, the above-described process has the disadvantage in that handling thereof is very difficult.

SUMMARY OF THE INVENTION

It is therefore an object of the present invention to provide an FRM disc preform and a manufacturing method thereof, which solves the above-mentioned shortcomings in the prior art, wherein a spiral shape manufactured and molded in the intermediate manufacturing process of an FRM disc does not easily collapse, handling thereof is extremely simplified and manufacturing efficiency can be enhanced.

An FRM disc performs in accordance with the present invention is formed as follows:

(1) In order to form a disc of a certain thickness by laminating in the direction of flat faces, a reinforcing fiber is provided so that winding thereof is made in the direction of radius to form a spiral shape having flat faces on its both sides. The reinforcing fiber, as spirally wound, is herein referred to as a "preform". Incidentally, the diameter of a spiral shape is determined by changing the number of windings of the reinforcing fiber so as to correspond to the diameter of a disc to be formed.

Further, a spray coating made of a matrix metal, formed by a thermal spraying on one or both of the flat faces of the reinforcing fiber of a spiral shape to hold the spiral shape, is provided.

Thereby, in the FRM disc preform according to the present invention, since a spiral shape formed by a reinforcing fiber is fixed and held (with adhesive) by a spray coating of a matrix metal formed by a thermal spraying on one or both of the flat faces, the spiral shape does not easily collapse, and that handling thereof is extremely simplified. Also, the work of post-processes such as laminating becomes extremely simple and the manufacturing efficiency of FRM discs can be enhanced. Also, since the molded spiral shape holds its shape, the manufacturing accuracy can be also enhanced.

Another FRM disc preform of the present invention is formed as follows:

(2) For the reinforcing fiber mentioned in (1) above, an $Al_2O_3$ fiber or a SiC fiber is used, and for the matrix metal for forming a spray coating, any one of an Al alloy, a Ti alloy or a Ti aluminide can be used.

Thereby, in addition to the function and effect mentioned in (1) above, a combination of a reinforcing fiber and a matrix metal forming a spray coating, which is of a good compatibility, can be obtained, the spiral shape of the FRM disc preform is fixed and held more tightly, handling thereof is further simplified and the strength of FRM discs made by a combined forming of a high temperature and a high pressure can be enhanced.

Further, another FRM disc preform of the present invention is formed, in addition to that mentioned in (1) above, as follows:

(3) For said reinforcing fiber mentioned in (1) above, a W (tungsten) fiber is used, and for the matrix metal, a γ type Ti aluminide super alloy is used.

Thereby, the same function and effect mentioned in (2) above can be obtained.

Further, the FRM disc preform of the present invention is formed, in addition to that mentioned in (1), (2) or (3) above, as follows:

(4) To one of the flat faces of the reinforcing fiber formed in a spiral shape, a metal foil of a same material as the matrix metal is applied, and on the flat face opposite to the flat face to which the metal foil is applied, a spray coating made of the matrix metal is provided.

Thereby, in addition to the function and effect mentioned in (1) to (3) above, the FRM disc preform, on which the spray coating is formed on one flat face, is easily removed for handling, and a laminating process of FRM disc preforms for a combined forming to be carried out after molding of FRM disc preforms can be simplified.

Further, the FRM disc preform of the present invention is formed, in addition to that mentioned in (1), (2), (3) or (4) above, as follows:

(5) Between an upper layer and a lower layer of the reinforcing fiber wound in a spiral shape, a matrix metal wire made of the same material as the matrix metal is provided.

Thereby, in addition to the function and effect mentioned in (1) to (4) above, (a) at the time of forming a preform of a spiral shape by laminating the reinforcing fiber, as the matrix metal wire is interposed as spacing elements between the reinforcing fibers, control of laminating process becomes easier, and (b) as the same material as in the matrix metal is used for the spacing elements, there occurs no lowering of the strength of FRM discs after a combined forming is made, and a process to take off the spacing elements after a spray coating is formed becomes unnecessary, thus the manufacturing can be simplified.

Further, a manufacturing method of an FRM disc preform of the present invention is as follows:

(6) (a) At least one of two discs used for forming a spiral shape of the reinforcing fiber is a disc with borings forming blank places in a radial direction, the two discs are disposed oppositely with a certain space therebetween and a reinforcing fiber is wound between the discs and a preform of a spiral shape having flat faces on both sides is formed.

(b) A thermal spraying is applied to one of the flat faces of the spiral-shaped preform from the direction of the blank places provided on the disc with borings, and a spray coating is formed to hold the spiral shape of the wound preform.

(c) The FRM disc preform on which the spray coating is formed is taken out from between the discs disposed oppositely.

By employing this means, an FRM disc preform having the function and effect mentioned in (1) above can be manufactured accurately and easily.

Further, a manufacturing method of an FRM disc preform of the present invention is, in addition to that mentioned in (6) above, as follows:

(7) In place of the process to form a preform of a spiral shape by winding a reinforcing fiber between two discs disposed oppositely, a process to form a preform in which a reinforcing fiber lapped with a spacing element is laminated and wound so that the spacing elements are interposed between the laminated reinforcing fibers, is employed.

By employing this means, in addition to the function and effect mentioned in (6) above, at the time of forming a preform of a spiral shape by laminating the reinforcing fibers, a matrix metal wire is interposed between the reinforcing fibers as a spacing element, the control of laminating becomes easier and a preform of a high accuracy can be manufactured.

Further, the manufacturing method of an FRM disc preform of the present invention is, in addition to that mentioned in (7) above, as follows:

(8) A process to take off the spacing element interposed between the laminated reinforcing fibers is added.

By employing this means, in addition to the function and effect mentioned in (7) above, a spacing element of a given material can be used and by use of a spacing element of which material is easily worked, laminating of reinforcing fibers can be controlled more precisely.

Further, the manufacturing method of an FRM disc preform of the present invention is, in addition to that mentioned in (6) above, as follows:

(9) In place of the process to form a preform of a spiral shape by winding a reinforcing fiber between two discs disposed oppositely, a process to form a preform of a spiral shape with flat faces on both sides in which the reinforcing fiber is fitted in grooves of a spiral shape provided on the flat face, which is facing toward the preform, of the disc with borings, out of the two discs, is employed.

By employing this means, in addition to the function and effect mentioned in (6) above, by changing the spaces between the grooves provided on the disc with borings in the direction of radius, the volumetric containing ratio $V_f$ distribution of the reinforcing fiber within the FRM disc preform can be freely changed. Also, as a matrix metal wire or a matrix metal ribbon of a Ti alloy which is hardly worked becomes unnecessary, FRM disc preforms can be manufactured at a lower cost.

BRIEF DESCRIPTION OF THE DRAWINGS

In the accompanying drawings:

FIGS. 1A–C are views showing a first preferred embodiment of an FRM disc preform according to the present invention, wherein FIG. 1(A) is a front view showing a state of winding a reinforcing fiber into a spiral shape, FIG. 1(B) is a sectional view taken along line 1B—1B in the direction of arrows in FIG. 1(A), and FIG. 1(C) is a partial sectional view of the FRM disc preform of the first preferred embodiment.

FIGS. 2A–C are views showing a second preferred embodiment of an FRM disc preform according to the present invention, wherein FIG. 2(A) is a front view showing a state of winding a reinforcing fiber into a spiral shape, FIG. 2(B) is a sectional view taken along line 2B—2B in the direction of arrows in FIG. 2(A), and FIG. 2(C) is a partial sectional view of the FRM disc preform of the second preferred embodiment.

FIGS. 3A–C are views showing a third preferred embodiment of an FRM disc preform according to the present invention, wherein FIG. 3(A) is a front view showing a state of winding a reinforcing fiber into a spiral shape, FIG. 3(B) is a sectional view taken along line 3B—3B in the direction of arrows in FIG. 3(A), and FIG. 3(C) is a partial sectional view of the FRM disc preform of the third preferred embodiment.

FIGS. 4A–C are views showing a disc with grooves and a fit mold used for winding a reinforcing fiber into a spiral shape in the third preferred embodiment according to the present invention, wherein FIG. 4(A) is a front view of the disc with grooves, FIG. 4(B) is a sectional view taken along line 4B—4B in the direction of arrows in FIG. 4(A), and FIG. 4(C) is a sectional view of the disc with grooves and the fit mold taken along line 4C—4C in the direction of arrows in FIG. 4(A).

DESCRIPTION OF THE PREFERRED EMBODIMENTS

Figure 1A:
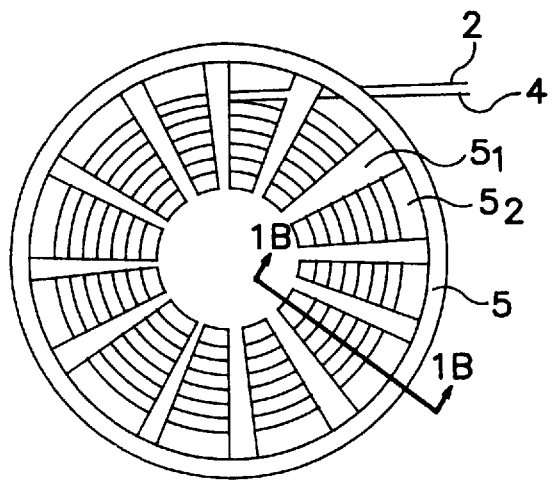

Herebelow, preferred embodiments of FRM disc preforms according to the present invention are described with reference to the figures. FIG. 1 is a drawing showing a first preferred embodiment of an FRM disc preform according to the present invention, wherein FIG. 1(A) is a front view showing a state of winding a reinforcing fiber into a spiral shape, FIG. 1(B) is a sectional view taken along line 1B—1B in the direction of arrows in FIG. 1(A), and FIG. 1(C) is a sectional view of a completed FRM disc preform.

As shown in the figures, two discs 5, 6 are disposed oppositely in parallel with a space of 140 (+5 to +10) $\mu$m which is slightly larger than the diameter of 140 $\mu$m of a wound reinforcing fiber 2 (a SiC fiber, a trade mark: SCS-6, a product of the TEXTRON Specialty Materials Co., USA). As shown in FIG. 1(A), one of the two discs is a disc 5 with borings 2 which are blank spaces formed by twelve spokes 5 extending in a radial direction and the other disc 6 is a disc without a boring. The space length between the discs 5, 6 is controlled by placing a disc-shape spacer (not shown) of a same thickness as the space length, after adjusted, into the center part of the discs 5, 6.

In this space portion, a reinforcing fiber 2 of a diameter of 140 μm and a Mo wire 4 of a diameter of 100 μm are lapped and wound as shown in FIG. 1(A). Upon completion of winding to a thickness corresponding to the diameter of a completed FRM disc preform 1, on the flat face of the disc 5 where the borings are provided as shown in FIG. 1(A), i.e. on one flat face of the spiral shape, a low pressure plasma spraying with Ti alloy powder is applied and a spray coating 7 is formed on the reinforcing fiber 2 and on the Mo wire 4. After forming of the spray coating 7, the reinforcing fiber 2 of a spiral shape and the Mo wire 4 together with the spray coating 7 are taken out from the discs 5, 6.

Figures 1B, 1C:
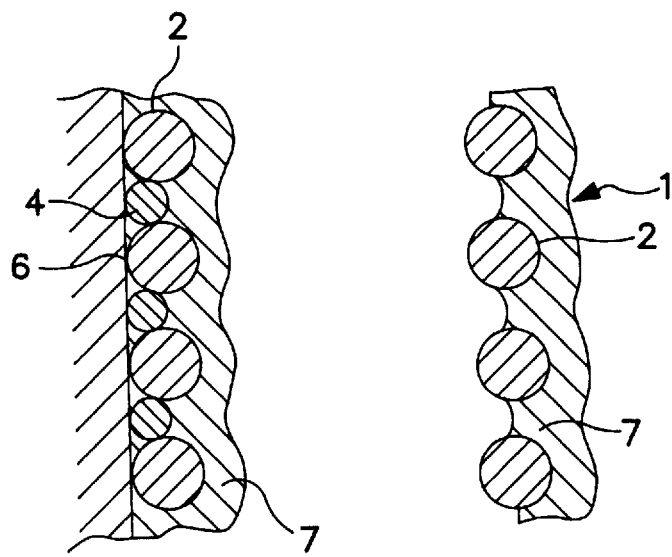

Following the above, only the Mo wire 4 which harms the strength of an FRM disc when it is applied by a combined forming is removed, and the remaining disc-shaped spiral fiber 2 with the spray coating 7 shown in FIG. 1(C) is a FRM disc preform.

Incidentally, as for the reinforcing fiber 2 of the first preferred embodiment, besides the SiC fiber, a W (tungsten) fiber or an $Al_2O_3$ (alumina) fiber can be used, and as for the matrix metal for forming the spray coating 7, besides the Ti alloy, an Al alloy, a metallic compound such as a Ti aluminide and a super alloy such as an Ni based alloy can be used. But a combination of a reinforcing fiber and a matrix metal is limited to that of a good compatibility, and reinforcing fiber materials and their compatible matrix metal materials are shown in Table 1 below:

TABLE 1

| Reinforcing fiber 2 | Compatible matrix metal 7 |
| --- | --- |
| $Al_2O_3$ fiber | Al alloy, Ti alloy, Ti aluminide |
| SiC fiber | Al alloy, Ti alloy, Ti aluminide |
| W fiber | Ti aluminide (γ type) super alloy |

Further, in addition to the laminate of FRM disc preforms 1 according to this preferred embodiment, as the case may be, metal foils 3 of a matrix metal compatible with a reinforcing fiber 2 shown in Table 1 are laminated between FRM disc preforms 1 and the laminate is applied by a combined forming.

Figure 2A:
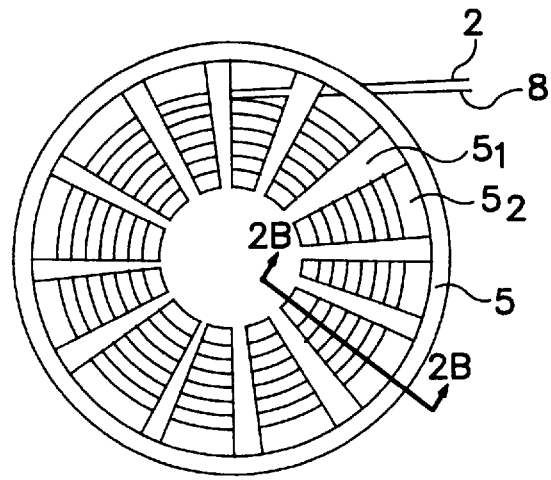
Figures 2B, 2C:
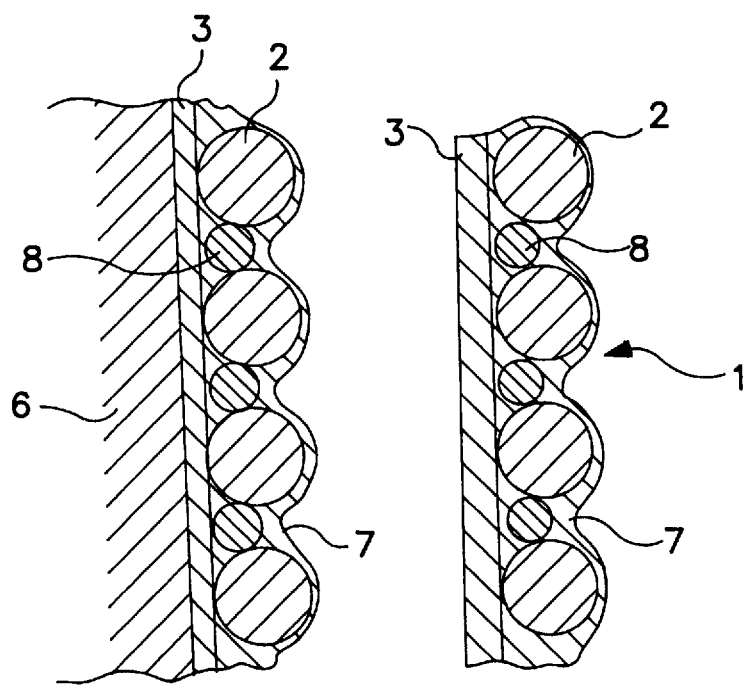

FIG. 2 is a drawing showing a second preferred embodiment of an FRM disc preform according to the present invention, wherein FIG. 2(A) is a front view showing a state of winding a reinforcing fiber into a spiral shape, FIG. 2(B) is a sectional view of a spray coating after a thermal spraying is applied taken along line 2B—2B in the direction of arrows in FIG. 2(A), and FIG. 2(C) is a sectional view of a completed FRM disc preform.

Two discs 5, 6 are disposed oppositely in parallel, a matrix metal foil 3 is applied to the side of the disc which does not have a boring and the space between the discs is controlled by placing a spacer of a disc shape into the center part of the discs so as to make the space length larger by +5 to +10 μm than the diameter of 140 μm of the reinforcing fiber 2, wherein the discs 5, 6 have the same structure as those of the first preferred embodiment.

In the space, a reinforcing fiber 2 of a diameter of 140 μm and a matrix metal wire 8 of a diameter of 100 μm or a matrix metal ribbon (100 μm×50 μm) are wound in accordance with the same method as in the first preferred embodiment. Upon completion of the winding process, a low pressure plasma spraying with matrix metal powder is applied on the spiral-shaped reinforcing fiber 2 from the direction of the flat face of the disc 5 in which the borings are provided. The spray coating 7 is formed on the reinforcing fiber 2 and the matrix metal wire 8 or the matrix metal ribbon, and combines them as shown in FIG. 2(B). After the spray coating 7 is formed, the spiral reinforcing fiber 2, the matrix metal wire 8 or the matrix metal ribbon and the matrix metal foil 3 together with the spray coating 7, all in one unit, are removed from the discs 5, 6 and a FRM disc preform 1 is made.

Incidentally, the reinforcing fiber 2 and the matrix metal used in the matrix metal foil 3 and the matrix wire 8 or the matrix metal ribbon in the second preferred embodiment are of the same materials as was used in the first preferred embodiment.

In place of the Mo wire 4 in the first preferred embodiment, which is used only as spacing elements to hold the spaces of the reinforcing fibers 2 and lowers the strength of the FRM disc preforms when a combined forming is applied thereto, a matrix metal wire 8 or a matrix metal ribbon is used in the second preferred embodiment and a process to take off the spacing elements after the spray coating 7 is formed becomes unnecessary, and therefore the process is simplified.

Further, a matrix metal foil 3 is previously provided on the side of the disc 6, a spiral shape of the reinforcing fiber 2 and the matrix metal wire 8 or the matrix metal ribbon is formed, and a low pressure plasma spraying is applied from the direction of the flat face of the disc 5, thus the FRM disc preform 1 is easily removed from the disc 6 after the spray coating 7 is formed and the laminating process can be simplified.

Figure 3A:
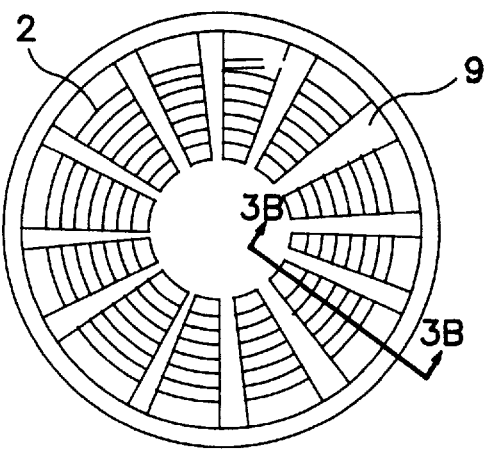
Figures 3B, 3C:
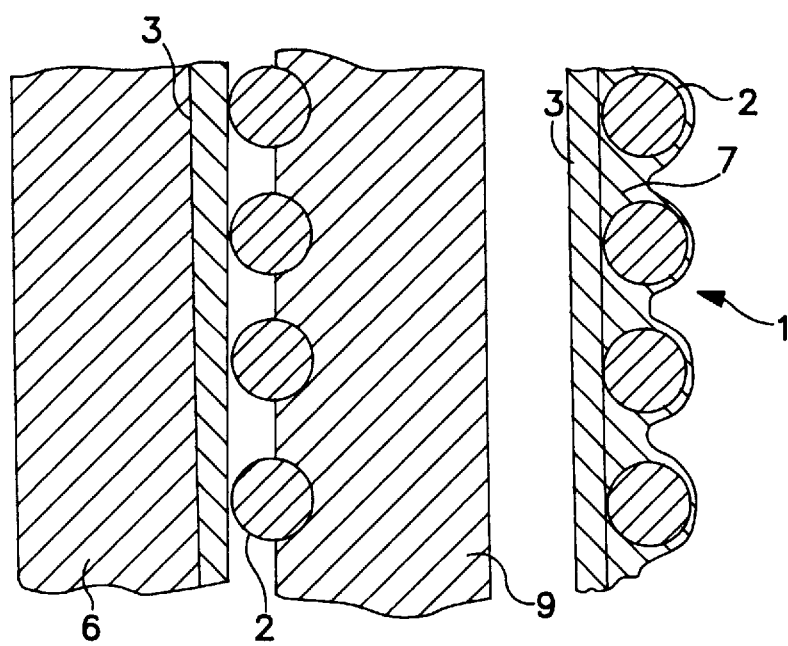

FIG. 3 is a drawing showing a third preferred embodiment of an FRM disc preform according to the present invention, wherein FIG. 3(A) is a front view showing a state of winding a reinforcing fiber into a spiral shape, FIG. 3(B) is a sectional view taken on line 3B—3B in the direction of arrows in FIG. 3(A), and FIG. 3(C) is a sectional view of a completed FRM disc preform.

Figure 4A:
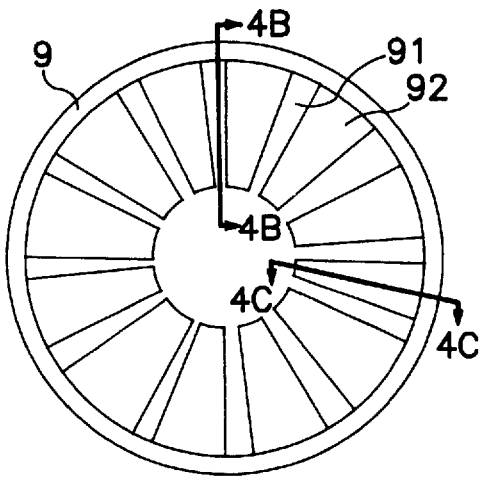
Figures 4B, 4C:
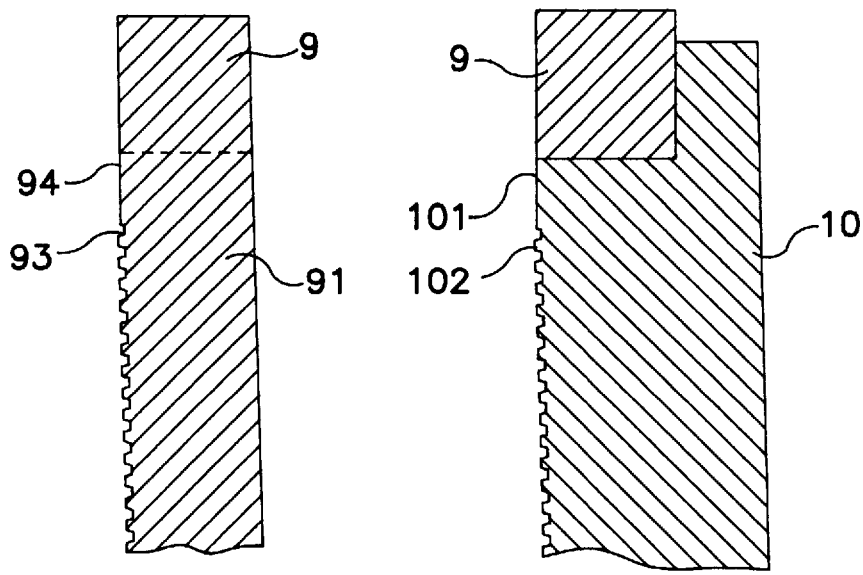
Figure 5A:
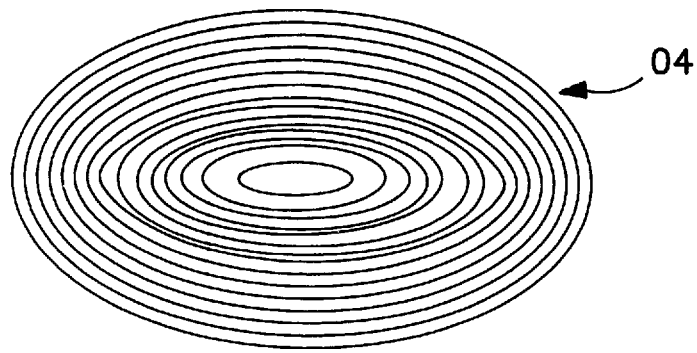
FIGS. 5A–E are perspective views of a prior art process of manufacturing an FRM disc.
Figure 5B:
Figure 5C:
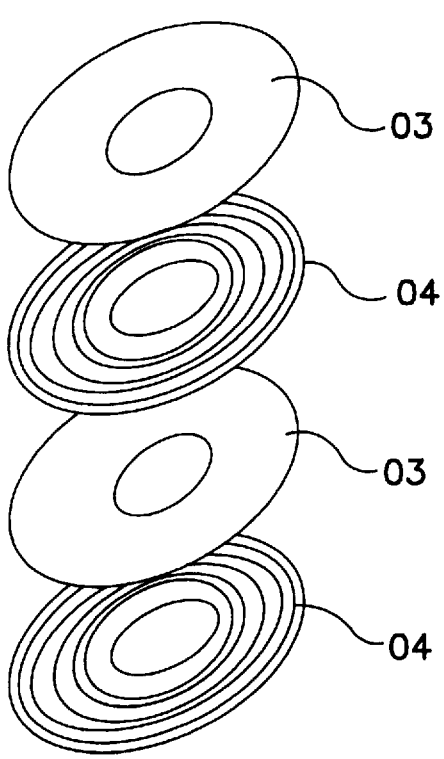
Figure 5D:
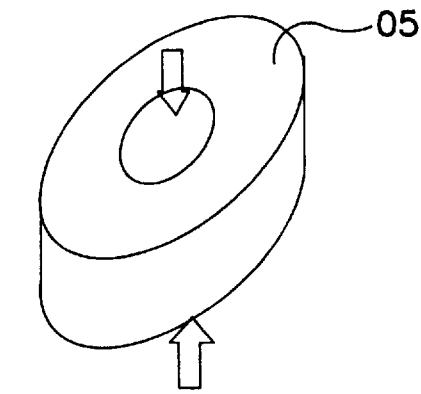
Figure 5E:
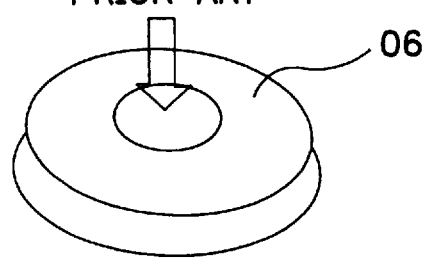

FIG. 4 is a drawing showing a disc with grooves, wherein FIG. 4(A) is a front view, FIG. 4(B) is a sectional view taken on line 4B—4B in the direction of arrows in FIG. 4(A), and FIG. 4(C) is a sectional view taken on line 4C—4C in the direction of arrows in FIG. 4(A).

In the third preferred embodiment, without a spacing element between the reinforcing fibers such as the Mo wire 4 in the first preferred embodiment and without the matrix metal wire 8 or the matrix metal ribbon etc. in the second preferred embodiment, a spiral shape is formed only by a reinforcing fiber 2 and fixed in its shape by a spray coating 7, thereby forming an FRM disc preform 1.

For this purpose, a disc 9 with grooves as shown in FIG. 4 is used for forming the reinforcing fiber 2 into a spiral shape. The disc 9 is formed with borings 92, and on the front faces 94 of spokes 91, spiral grooves 93 in which the reinforcing fiber 2 is placed are provided In the borings 92, a mold 10 which is of a same shape as that of the borings 92 is fitted.

The mold 10 is made so that the front face 101 thereof, when fitted into the borings 92, makes same face as the front faces 94 of the spokes 91 on which grooves 93 are provided. Further, on the front face 101 of the mold 10, grooves 102 are provided so as to connect continuously to the grooves 93 provided on the spokes 91 to form a spiral shape. While the mold 10 is fitted in the borings 92, a reinforcing fiber 2 is fitted in the grooves 93, 102 in order to form a spiral shape of the reinforcing fiber 2. Also, a disc 6 is placed and fixed via a matrix metal foil 3 as shown in FIG. 3(B). Then, the mold 10 fitted in the borings 92 of the disc 9 is removed and a low pressure plasma spraying with matrix metal powder is applied to the spiral fiber from the direction of the face where the borings are provided. Thus the reinforcing fiber 2 of a spiral shape is fixed and adhered (with adhesive) to the matrix metal foil 3 by a spray coating 7. Finally, discs 6, 9 are removed and an FRM disc preform is completed.

Incidentally, the reinforcing fiber 2 and the matrix metal used in the third preferred embodiment are of same materials as those used in first preferred embodiment.

According to the third preferred embodiment, by changing the spaceing of the grooves 93 provided on the spokes 91 and the grooves 102 provided on the mold 10 in the direction of radius, the volumetric containing ratio $V_f$ distribution of the reinforcing fiber 2 within an FRM disc preform can be freely changed. And the matrix metal wire 8 or the matrix metal ribbon made of a Ti alloy becomes unnecessary and there is an advantage that an FRM disc preform can be manufactured at a lower cost.

As described above, as the spiral shape of a reinforcing fiber forming an FRM disc preform can be fixed and adhered (with adhesive) by a spray coating of a matrix metal formed on the flat face of the spiral shape, the spiral shape does not easily collapse and handling thereof becomes extremely simplified and the FRM manufacturing work included in the post-processes such as a laminating process becomes extremely simplified and the manufacturing efficiency and the manufacturing accuracy of FRM discs can be enhanced.

While the preferred forms of the present invention have been described, variations thereto will occur to those skilled in the art within the scope of the present inventive concepts which are delineated by the following claims.

What is claimed is:

1. An FRM disc preform comprising:
   a reinforcing fiber wound in a spiral shape and having opposing flat faces, said wound reinforcing fiber forming a plurality of windings;
   a spray coating, made of a matrix metal, formed on one or both of said flat faces of said reinforcing fiber to hold said spiral shape thereof;
   a spacing element comprising a matrix metal wire interposed between each of said windings of said reinforcing fiber in order to maintain a space between each of said windings, wherein said spacing element can be removed from said preform or can remain as a part of said preform, and said spacing element is formed of the same material as that of said matrix metal; and
   a metal foil provided on one of said flat faces of said reinforcing fiber, said metal foil being formed of the same material as that of said matrix metal, wherein said spray coating is formed on the other of said flat faces of said reinforcing fiber on which said metal foil is not provided.

2. An FRM disc preform comprising:
   a reinforcing fiber wound in a spiral shape and having opposing flat faces, said wound reinforcing fiber forming a plurality of windings;
   a spray coating, made of a matrix metal, formed on one or both of said flat faces of said reinforcing fiber to hold said spiral shape thereof; and
   a spacing element comprising a matrix metal wire interposed between each of said windings of said reinforcing fiber in order to maintain a space between each of said windings, wherein said spacing element can be removed from said preform or can remain as a part of said preform, and said spacing element is formed of the same material as that of said matrix metal.

3. An FRM disc preform comprising:
   a reinforcing fiber wound in a spiral shape and having opposing flat faces, said wound reinforcing fiber forming a plurality of windings;
   a spray coating, made of a matrix metal, formed on one or both of said flat faces of said reinforcing fiber to hold said spiral shape thereof; and
   a spacing element comprising a matrix metal wire interposed between each of said windings of said reinforcing fiber in order to maintain a space between each of said windings, wherein said spacing element can be removed from said preform or can remain as a part of said preform, and said spacing element is formed of the same material as that of said matrix metal,
   wherein said reinforcing fiber is made of an $Al_2O_3$ fiber or a SiC fiber, and said matrix metal is made of any one of an Al alloy, a Ti alloy or a Ti aluminide.

4. The FRM disc preform as claimed in claim 3, further comprising a metal foil provided on one of said flat faces of said reinforcing fiber, said metal foil being formed of the same material as that of said matrix metal, wherein said spray coating is formed on the other of said flat faces of said reinforcing fiber on which said metal foil is not provided.

5. An FRM disc preform comprising:
   a reinforcing fiber wound in a spiral shape and having opposing flat faces, said wound reinforcing fiber forming a plurality of windings, wherein said reinforcing fiber is made of a W fiber;
   a spacing element interposed between each of said windings of said reinforcing fiber in order to maintain a space between each of said windings, wherein said spacing element can be removed from said preform or can remain as a part of said preform; and
   a spray coating, made of a matrix metal, formed on one or both of said flat faces of said reinforcing fiber to hold said spiral shape thereof, wherein said matrix metal is made of a Ti aluminide.

6. The FRM disc preform as claimed in claim 5, further comprising a metal foil provided on one of said flat faces of said reinforcing fiber, said metal foil being formed of the same material as that of said matrix metal, wherein said spray coating is formed on the other of said flat faces of said reinforcing fiber on which said metal foil is not provided.

7. The FRM disc preform as claimed in claim 5, wherein said spacing element comprises a matrix metal wire provided between said reinforcing fibers and being formed of the same material as that of said matrix metal.

8. A method of manufacturing an FRM disc preform, said method comprising:
   winding a reinforcing fiber between two oppositely disposed discs so as to form a wound reinforcing fiber having a spiral shape and flat faces on opposing sides thereof, wherein at least one of said discs includes a plurality of radially projecting blank areas;
   spraying a matrix metal on one of said flat faces of said wound reinforcing fiber, said matrix metal being sprayed in a direction toward said blank areas so as to form a spray coating for holding the spiral shape of said wound reinforcing fiber; and
   removing said wound reinforcing fiber, with said spray coating, from between said discs.

9. The method as claimed in claim 8, wherein said winding process includes winding said reinforcing fiber with spacing elements such that said spacing elements are interposed between each winding of said reinforcing fiber, said spacing elements including a matrix metal wire formed of a material which is the same as the material forming said matrix metal.

10. The method as claimed in claim 9, further comprising removing said spacing elements from between said reinforcing fibers.

11. The method as claimed in claim 8, wherein said winding operation includes fitting said reinforcing fiber in grooves provided on an interior flat surface of said disc which includes said borings, said grooves being provided in a spiral shape.

\* \* \* \* \*